United States Patent
Elwart et al.

(10) Patent No.: US 11,377,114 B2
(45) Date of Patent: Jul. 5, 2022

(54) CONFIGURATION OF IN-VEHICLE ENTERTAINMENT BASED ON DRIVER ATTENTION

(71) Applicant: GM GLOBAL TECHNOLOGY OPERATIONS LLC, Detroit, MI (US)

(72) Inventors: Tessa E. Elwart, Ann Arbor, MI (US); Andrew Wassef, Rochester, MI (US); Alyssa L. Scheske, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 327 days.

(21) Appl. No.: 16/353,418

(22) Filed: Mar. 14, 2019

(65) Prior Publication Data

US 2020/0290630 A1    Sep. 17, 2020

(51) Int. Cl.
*B60W 40/08*     (2012.01)
*B60W 50/00*     (2006.01)
*B60W 50/14*     (2020.01)

(52) U.S. Cl.
CPC ........ *B60W 50/0098* (2013.01); *B60W 40/08* (2013.01); *B60W 50/14* (2013.01);
(Continued)

(58) Field of Classification Search
CPC .. B60W 50/0098; B60W 40/08; B60W 50/14; B60W 2050/146;
(Continued)

(56) References Cited

U.S. PATENT DOCUMENTS

| | | | |
|---|---|---|---|
| 9,579,060 B1 * | 2/2017 | Lisy | A42B 3/0453 |
| 10,572,745 B2 * | 2/2020 | Kuehnle | B60W 50/14 |

(Continued)

FOREIGN PATENT DOCUMENTS

| | | | | |
|---|---|---|---|---|
| EP | 3683623 A1 * | 7/2020 | | B60W 50/0098 |
| GB | 2562470 A * | 8/2017 | | H04W 48/02 |

OTHER PUBLICATIONS

U.S. Appl. No. 64/757,744, filed Nov. 2018, Jiang et al.*
(Continued)

*Primary Examiner* — Donald J Wallace
*Assistant Examiner* — Daniel M. Robert
(74) *Attorney, Agent, or Firm* — Cantor Colburn LLP (57) ABSTRACT

A system and method for carrying out a remedial action based on monitoring driver attention of a vehicle driver. The method includes: obtaining driver attention sensor data from one or more driver attention sensors that are installed on the vehicle as onboard vehicle sensors; detecting a driver inattention event based on the obtained driver attention sensor data; determining one or more driver inattention metrics based on the obtained driver attention sensor data and in response to the detected driver inattention event; based on at least one of the driver inattention metrics, determining one or more remedial actions to be carried out; and carrying out the one or more remedial actions, wherein, when at least one of the one or more remedial actions is carried out, in-vehicle entertainment that is provided by one or more vehicle-user interfaces of the vehicle is restricted or prevented.

9 Claims, 3 Drawing Sheets

(52) U.S. Cl.
CPC ............... *B60W 2040/0818* (2013.01); *B60W 2050/146* (2013.01)

(58) Field of Classification Search
CPC ......... B60W 2040/0818; B60W 50/16; B60W 2050/143; B60W 10/30; B60W 2540/229; B60W 2050/0002; B60W 2050/0043; B60W 2540/00; B60W 2710/30; G08C 17/02

See application file for complete search history.

(56) References Cited

U.S. PATENT DOCUMENTS

| | | | | |
|---|---|---|---|---|
| 11,097,741 | B1* | 8/2021 | Chan | G06K 9/00832 |
| 2011/0111724 | A1* | 5/2011 | Baptiste | H04M 1/6075 |
| | | | | 455/404.1 |
| 2011/0169625 | A1* | 7/2011 | James | G08G 1/166 |
| | | | | 340/439 |
| 2012/0095641 | A1* | 4/2012 | Merk | G08G 1/0175 |
| | | | | 701/28 |
| 2012/0268235 | A1* | 10/2012 | Farhan | G05B 9/02 |
| | | | | 340/3.1 |
| 2013/0057638 | A1* | 3/2013 | Tamkivi | H04W 4/027 |
| | | | | 348/14.02 |
| 2014/0019167 | A1* | 1/2014 | Cheng | G06Q 40/08 |
| | | | | 705/4 |
| 2014/0167967 | A1* | 6/2014 | He | B60W 50/14 |
| | | | | 340/576 |
| 2015/0054934 | A1* | 2/2015 | Haley | B60W 40/09 |
| | | | | 348/78 |
| 2017/0043781 | A1* | 2/2017 | Prakah-Asante | B60W 40/08 |
| 2017/0203689 | A1* | 7/2017 | Kuwahara | G06N 5/048 |
| 2017/0332347 | A1* | 11/2017 | Boss | H04W 68/005 |
| 2018/0086264 | A1* | 3/2018 | Pedersen | G06N 5/02 |
| 2018/0118219 | A1* | 5/2018 | Hiei | B60W 40/09 |
| 2018/0174457 | A1* | 6/2018 | Taylor | G06K 9/00302 |
| 2019/0082377 | A1* | 3/2019 | Silver | G08G 1/096741 |
| 2019/0095050 | A1* | 3/2019 | Gruber | B60K 35/00 |
| 2019/0147274 | A1* | 5/2019 | Tanaka | B60K 28/066 |
| | | | | 701/36 |
| 2019/0213429 | A1* | 7/2019 | Sicconi | G06F 3/016 |
| 2020/0114924 | A1* | 4/2020 | Chen | B60W 50/0098 |
| 2021/0221404 | A1* | 7/2021 | Reiner | B60W 40/08 |

OTHER PUBLICATIONS

You et al., "CarSafe App: Alerting Drowsy and Distracted Drivers Using Dual Cameras on Smartphones," Proceeding of the 11th Annual International Conference on Mobile Systems, Applications, and Services (Jun. 2013): 13-26, https://doi.org/10.1145/2462456.2465428 (Year: 2013).*

Jiang et al. (U.S. Appl. No. 62/757,744), filed Nov. 8, 2018. (Year: 2018).*

* cited by examiner

CONFIGURATION OF IN-VEHICLE ENTERTAINMENT BASED ON DRIVER ATTENTION

INTRODUCTION

The present invention relates to obtaining onboard sensor data from one or more driver attention sensors and configuring one or more vehicle functions based on driver attention as determined through the onboard sensor data.

Vehicles include hardware and software capable of obtaining and processing various information, including information that is obtained by onboard vehicle sensors. These onboard vehicle sensors can capture sensor data concerning the operation of the vehicle and/or one or more occupants of the vehicle. Many passenger vehicles can also provide in-vehicle entertainment to one or more passengers.

SUMMARY

According to one aspect of the invention, there is provided a method of carrying out a remedial action based on monitoring driver attention of a vehicle driver. The method includes: obtaining driver attention sensor data from one or more driver attention sensors that are installed on the vehicle as onboard vehicle sensors; detecting a driver inattention event based on the obtained driver attention sensor data; determining one or more driver inattention metrics based on the obtained driver attention sensor data and in response to the detected driver inattention event; based on at least one of the driver inattention metrics, determining one or more remedial actions to be carried out; and carrying out the one or more remedial actions, wherein, when at least one of the one or more remedial actions is carried out, in-vehicle entertainment that is provided by one or more vehicle-user interfaces of the vehicle is restricted or prevented.

According to various embodiments, this method may further include any one of the following features or any technically-feasible combination of some or all of these features:
  the one or more driver attention sensors include a driver-facing camera, a steering wheel touch sensor, and/or a steering wheel torque sensor;
  the driver inattention event is demarcated by a driver inattention start event and a driver inattention end event, each of which is detected or otherwise determined by the vehicle;
  a first one of the one or more driver inattention metrics is determined in response to detecting the driver inattention end event;
  the one or more driver inattention metrics includes a plurality of driver inattention metrics;
  the plurality of driver inattention metrics includes a driver inattention event length and a driver inattention event count;
  the one or more remedial actions are those of a first remedial action set when the driver inattention event length exceeds a first driver inattention event length threshold and/or when the driver inattention event count exceeds a first driver inattention event count threshold;
  the one or more remedial actions are those of a second remedial action set when the driver inattention event length exceeds a second driver inattention event length threshold and/or when the driver inattention event count exceeds a second driver inattention event count threshold, wherein the first remedial action set includes at least one remedial action that is different than at least one remedial action of the second remedial action set;
  the one or more remedial actions, when carried out, results in turning down or restricting audio volume produced as a result of an in-vehicle entertainment application;
  the one or more remedial actions, when carried out, results in disabling or otherwise preventing use of an in-vehicle entertainment application for a predetermined amount of time;
  the one or more remedial actions, when carried out, results in restricting use of the in-vehicle entertainment application until a next key cycle;
  the method further comprises generating a driver attention report based on the one or more driver attention metrics and presenting the driver attention report to one or more vehicle users; and/or
  obtaining onboard sensor data from an onboard vehicle sensor other than the driver attention sensors, and using the onboard sensor data in determining the one or more remedial actions to be carried out.

According to another aspect of the invention, there is provided a method of carrying out a remedial action based on monitoring driver attention of a vehicle driver. The method includes: obtaining driver attention sensor data from one or more driver attention sensors that are installed on the vehicle as onboard vehicle sensors; detecting a driver inattention event based on the obtained driver attention sensor data; determining one or more driver inattention metrics based on the driver attention sensor data and in response to the detected driver inattention event; based on at least one of the driver inattention metrics, determining a driver inattention level; determining one or more remedial actions based on the determined driver inattention level; and carrying out the one or more remedial actions based on the determined driver inattention level, wherein, when at least one of the one or more remedial actions is carried out, functionality of an in-vehicle entertainment application is disabled or restricted.

According to various embodiments, this method may further include any one of the following features or any technically-feasible combination of some or all of these features:
  the one or more driver inattention metrics includes a plurality of driver inattention metrics, and wherein the at least one driver inattention metric includes a driver inattention event length and a driver inattention event count;
  the one or more driver attention sensors includes a camera that is configured as an eye-tracking sensor and that obtains driver attention data that indicates whether the vehicle driver is looking forward and/or toward a road on which the vehicle is driving;
  the method further comprises: generating a driver attention report based on the one or more driver attention metrics and presenting the driver attention report to one or more vehicle users, wherein the driver attention report, when provided, displays driver attention information that is based on the one or more driver inattention metrics; and/or
  sending the driver attention report to a handheld wireless device, wherein the handheld wireless device is configured to display the driver attention report on an electronic display of the handheld wireless device.

According to another aspect of the invention, there is provided a vehicle driver attention monitoring system for a vehicle. The vehicle driver attention monitoring system includes: one or more driver inattention sensors that are installed on the vehicle; an onboard computer having a processor; memory that is communicatively coupled to the processor of the onboard computer, wherein the memory stores computer instructions; and one or more vehicle-user interfaces for providing visual and/or audio output to a local vehicle user; wherein the computer instructions, when executed by the processor, cause the vehicle driver attention monitoring system to: (i) obtain driver attention sensor data from the one or more driver attention sensors; (ii) detect a driver inattention event based on the obtained driver attention sensor data; (iii) determine one or more driver inattention metrics based on the driver attention sensor data and in response to the detected driver inattention event; (iv) based on at least one of the driver inattention metrics, determine one or more remedial actions to be carried out; and (v) carry out the one or more remedial actions, wherein, when at least one of the one or more remedial actions is carried out, in-vehicle entertainment that is provided by the one or more vehicle-user interfaces of the vehicle is restricted or prevented. In at least some embodiments, the onboard computer may be an external object calculation module (EOCM).

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables a remedial action to be carried out in response to detecting that a driver of a vehicle is inattentive with respect to driving the vehicle. According to various embodiments, the system and method described herein can be used to monitor a driver of a vehicle using one or more driver attention sensors, and to then carry out one or more remedial actions based on driver attention sensor data. The one or more remedial actions can include restricting or preventing one or more in-vehicle entertainment functions of the vehicle (e.g., radio functionality, other infotainment applications). Also, in some embodiments, the count and/or length of the one or more driver inattention events can be used to determine remedial action(s) that are to be carried out. In general, a driver inattention event is an event in which a driver of a vehicle is determined to not be providing suitable attention to driving the vehicle. The driver inattention event(s) are determined based on driver attention sensor(s), which can include an eye-tracking sensor (as implemented by a driver-facing camera, for example), a steering wheel touch sensor, and/or a steering wheel torque sensor. In one embodiment, an external object calculation module (EOCM) that carries out autonomous vehicle (AV) functionality can be used to perform the monitoring step of one or more embodiments of the method.

In one exemplary scenario, the system and method can improve vehicle safety by incentivizing the vehicle driver to pay attention to driving the vehicle. The incentives can be provided in the form of inhibiting or otherwise restricting certain in-vehicle entertainment. Moreover, at least according to some embodiments, the level or degree of the remedial actions (e.g., the inhibiting of in-vehicle entertainment) can be determined based on a level of driver inattention. The level of driver inattention (or "driver inattention level") may be based on a count of driver inattention events (or "driver inattention event count") and/or a length of driver inattention (or "driver inattention event length"), which can be measured based on an amount of time of one or more driver inattention events.

Figure 1:
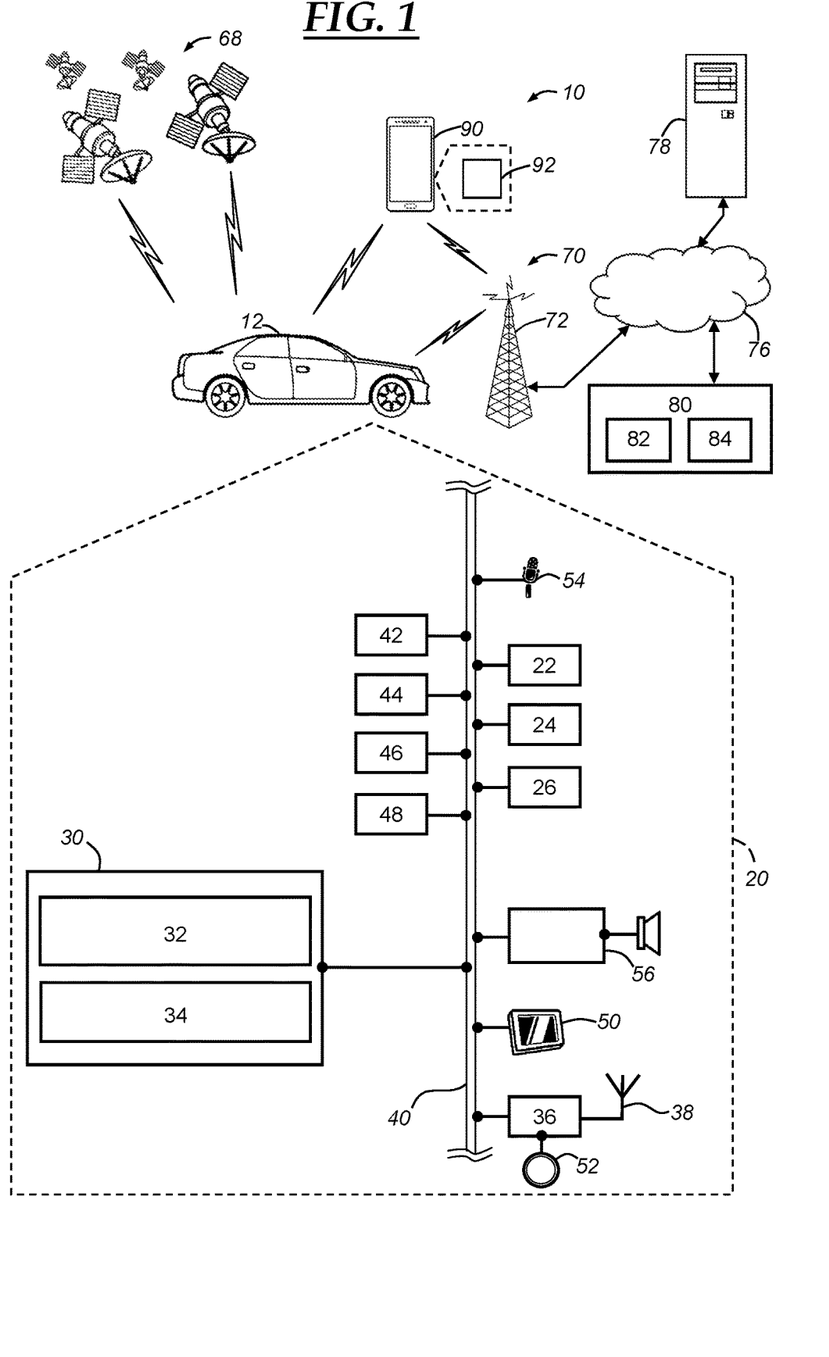
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12, a constellation of global navigation satellite system (GNSS) satellites 68, one or more wireless carrier systems 70, a land communications network (referred to herein as "land network") 76, a remote server 78, a backed vehicle services facility 80, and a handheld wireless device (HWD) 90. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed methods as well.

Wireless carrier system 70 may be any suitable cellular telephone system. The wireless carrier system 70 is shown as including a cellular tower 72; however, the wireless carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., telematics unit 36 of the vehicle 12, HWD 90). The wireless carrier system 70 can implement any suitable communications technology, including GSM/GPRS technology, CDMA or CDMA2000 technology, LTE technology, etc. In general, the wireless carrier systems 70, their components, the arrangement of their components, the interaction between the components, etc. is generally known in the art.

Apart from using the wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of the wireless carrier system 70.

Land network 76 may be a conventional land-based telecommunications network that is connected to one or more landline telephones and connects the wireless carrier system 70 to the remote server 78 and/or the vehicle backend services facility 80. For example, the land network 76 may include a public switched telephone network (PSTN) such as that used to provide hardwired telephony, packet-switched data communications, and the Internet infrastructure. One or more segments of the land network 76 could be implemented through the use of a standard wired network, a fiber or other optical network, a cable network, power lines, other wireless networks such as wireless local area networks (WLANs), or networks providing broadband wireless access (BWA), or any combination thereof.

Remote server(s) (or computer(s)) 78 (referred to collectively as the "remote server") (only one shown) can include any of a number of servers or computers accessible via a private or public network such as the Internet. In one embodiment, each such remote server 78 can be used for one or more purposes, such as for supporting a vehicle user computer application that allows a user to access vehicle information and/or control or configure certain vehicle functionality. In one embodiment, the remote server 78 can support (e.g., act as a server for) a vehicle user application 92 that is carried out by the HWD 90. Additionally or alternatively, such accessible remote servers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12, backend facility 80, or both. Each of the one or more remote servers can include one or more processors and/or memory.

Vehicle backend services facility (or "backend facility" for short) 80 is a remote facility and is located at a physical location that is located remotely from the vehicle 12. The backend facility 80 may be designed to provide the vehicle electronics 20 with a number of different system back-end functions through use of one or more electronic servers 82. The vehicle backend services facility 80 includes vehicle backend services servers 82 and databases 84, which may be stored on a plurality of memory devices. The vehicle backend services facility 80 may include any or all of these various components and, in at least some embodiments, each of the various components are coupled to one another via a wired or wireless local area network. The backend facility 80 may receive and transmit data via one or more modems connected to the land network 76. Data transmissions may also be conducted by wireless systems, such as IEEE 802.11x, GPRS, and the like. Those skilled in the art will appreciate that, although only one backend facility 80 and one remote server 78 are depicted in the illustrated embodiment, numerous backend facilities 80 and/or remote servers 78 may be used. Moreover, a plurality of backend facilities 80 and/or remote servers 78 can be geographically distributed and can each coordinate information and services with one another, as those skilled in the art will appreciate.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. This software may be stored in computer-readable memory, which can include or be any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and magnetic or optical disc drives. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. The backend facility 80 can include a number of routers, modems, switches, or other network devices that can be used to provide networking capabilities, such as connecting with the land network 76 and/or the wireless carrier system 70. Databases 84 can be stored on a plurality of memory, such as a powered temporary memory or any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and/or magnetic or optical disc drives.

The handheld wireless device (HWD) 90 is a mobile device and a short-range wireless communication (SRWC) device (i.e., a device capable of SRWC (e.g., Bluetooth™, Wi-Fi™)) and may include: hardware, software, and/or firmware enabling cellular telecommunications and SRWC as well as other mobile device applications, such as the vehicle user application 92. The hardware of the HWD 90 may comprise: a processor and memory for storing the software, firmware, etc. The HWD processor and memory may enable various software applications, which may be preinstalled or installed by the user (or manufacturer). In one embodiment, the HWD 90 includes the vehicle user application 92 that enables a vehicle user to communicate with the vehicle 12 (e.g., such as inputting route or trip parameters) and/or control various aspects or functions of the vehicle, some of which are listed above. Additionally, one or more applications may allow the user to connect with the backend facility 80 or call center advisors.

In some embodiments, the HWD 90 is a personal SRWC device. As used herein, a personal SRWC device is a mobile device that is capable of SRWC, that is portable by a user, and where the portability of the device is at least partly dependent on the user, such as a wearable device (e.g., a smartwatch or smart glasses or goggles), an implantable device, or a handheld device (e.g., a smartphone, a tablet, a laptop). As used herein, a short-range wireless communications (SRWC) device is a device capable of SRWC. In one particular embodiment, the HWD 90 can be a personal cellular SRWC device that includes a cellular chipset and/or cellular connectivity capabilities, as well as SRWC capabilities. Using a cellular chipset, for example, the HWD 90 can connect with various remote devices, including the remote servers 78 and the servers 82 of the backend facility 80 via wireless carrier system 70 and/or land network 76.

The vehicle user application 92 is an application that enables the user to view information pertaining to the vehicle 12. In some embodiments, the vehicle user application 92 enables the user to send commands to the vehicle, such as to remotely start the vehicle's engine (or other primary propulsion system), to lock/unlock vehicle doors, etc. The vehicle user application 92 can also enable the user to view a driver attention report which is a report that includes information pertaining to one or more driver inattention events detected by the vehicle as a part of a vehicle trip. The driver attention report can provide a summary or overview of the driver inattention events, as well as a driver inattention level or driver inattention metrics. The driver inattention metrics may be any metrics that are used to assess a driver inattention level and may be used to convey a degree or level of driver inattention. Exemplary driver inattention metrics include a driver inattention event count, and a driver inattention event length (e.g., a driver inattention event overall length, a driver inattention event average length). The driver inattention event overall length is the sum of the driver inattention lengths of the driver inattention events detected during the vehicle trip, and the driver inattention event average length is an average of the driver inattention lengths of the driver inattention events detected during the vehicle trip. Thus, in at least some embodiments, these metrics provide a quantitative measure of the level of driver inattention, either during a single trip or portion of a trip, or over the course of a plurality of trips. Also, in one embodiment, feedback information can be provided as to what actions (or detected actions) caused the system to determine the presence of a driver inattention event so that this feedback can be provided to the driver in an effort to incentivize them to avoid these actions in the future.

Vehicle 12 is depicted in the illustrated embodiment as a passenger car, but it should be appreciated that any other vehicle including motorcycles, trucks, sports utility vehicles (SUVs), recreational vehicles (RVs), marine vessels including various types of boats and ships, passenger aircrafts, etc., can also be used. Some of the vehicle electronics 20 are shown generally in FIG. 1 and includes a global navigation satellite system (GNSS) receiver 22, a body control module or unit (BCM) 24, an engine control module or unit (ECM) 26, an onboard computer 30, a telematics unit 36, onboard vehicle sensors 42-48, and vehicle-user interfaces 50-56. Some or all of the different vehicle electronics may be connected for communication with each other via one or more communication busses, such as communications bus 40. The communications bus 40 provides the vehicle electronics 20 with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. In other embodiments, each of the VSMs can communicate using a wireless network and can include suitable hardware, such as short-range wireless communications (SRWC) circuitry.

The vehicle 12 can include numerous vehicle system modules (VSMs) as part of the vehicle electronics 20, such as the GNSS receiver 22, the BCM 24, the ECM 26, the onboard computer 30, the telematics unit 36, onboard vehicle sensors 42-48, and vehicle-user interfaces 50-56, which will be described in detail below. The vehicle 12 can also include other VSMs in the form of electronic hardware components that are located throughout the vehicle, and which may receive input from one or more sensors and use the sensed input to perform diagnostic, monitoring, control, reporting, and/or other functions. Each of the VSMs can be connected by the communications bus 40 to the other VSMs. One or more VSMs may periodically or occasionally have their software or firmware updated and, in some embodiments, such vehicle updates may be over the air (OTA) updates that are received from the remote server 78 or the backend facility 80 via land network 76, cellular carrier system 70, and telematics unit 36, for example. As is appreciated by those skilled in the art, the above-mentioned VSMs are only examples of some of the modules that may be used in vehicle 12, as numerous others are also possible.

The global navigation satellite system (GNSS) receiver 22 receives radio signals from a constellation of GNSS satellites 68. The GNSS receiver 22 can be configured to comply with and/or operate according to particular regulations or laws of a given region (e.g., country). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 68. And, in another example, GNSS receiver 22 can be a BDS receiver that receives a plurality of GNSS (or BDS) signals from a constellation of GNSS (or BDS) satellites 68. The GNSS receiver 22 can include at least one processor and memory, including a non-transitory computer readable memory storing instructions (software) that are accessible by the processor for carrying out the processing performed by the receiver 22. In one embodiment, the vehicle location can be determined through the GNSS receiver 22 and reported to a remote server, such as the servers 82 at the backend facility 80 and/or the remote server 78.

The GNSS receiver 22 can include at least one processor and memory, including a non-transitory computer readable memory storing instructions (software) that are accessible by the processor for carrying out the processing performed by the GNSS receiver 22. The GNSS receiver 22 can determine a vehicle location, which can be represented in the form of geographical coordinates (e.g., latitude, longitude, elevation). The vehicle location (and other information, such as GNSS time data) can be sent and/or periodically reported to the backed facility 80, which can store the vehicle location.

The body control module (BCM) 24 can be used to control various VSMs of the vehicle, as well as obtain information concerning the VSMs, including their present state(s) or status(es), as well as onboard sensor data. The BCM 24 is shown in the exemplary embodiment of FIG. 1 as being communicatively coupled to the communication bus 40. In some embodiments, the BCM 24 may be integrated with or part of a center stack module (CSM), an infotainment unit, the onboard computer 30, or other VSMs. Or, the BCM may be a separate device that is connected to other VSMs via the communications bus 40. The BCM 24 can include a processor and/or memory, which can be similar to processor 32 and memory 34 of the onboard computer 30, as discussed below. The BCM 24 may communicate with the onboard computer 30 and/or one or more vehicle system modules (VSMs), such as the engine control module (ECM) 26 and/or the telematics unit 36. Software stored in the memory and executable by the processor enables the BCM 24 to direct one or more vehicle functions or operations including, for example, controlling central locking, air conditioning, power mirrors, controlling the vehicle primary mover (e.g., engine, primary propulsion system), and/or controlling various other vehicle modules.

The engine control module (ECM) 26 may control various aspects of engine operation such as fuel ignition and ignition timing. The ECM 26 is connected to the communications bus 40 and may receive operation instructions (or vehicle commands) from the BCM 24 or other vehicle system modules, such as the onboard computer 30 or other VSMs. In one scenario, the ECM 26 may receive a command from the BCM 24 (or other VSM) to place the vehicle in a primary propulsion on state (from a primary propulsion off state)— i.e., initiate the vehicle ignition or other primary propulsion system (e.g., a battery powered motor). In at least some embodiments when the vehicle is a hybrid or electric vehicle, a primary propulsion control module can be used instead of (or in addition to) the ECM 26, and this primary propulsion control module can be used to obtain status information regarding the primary mover (including electrical motor(s) and battery information). A primary propulsion off state refers to a state in which the primary propulsion system of the vehicle is off, such as when the internal combustion engine is not running or idling, when a vehicle key is not turned to a START or ON (or accessory) position, or when the power control system for one or more electric motors of an electric vehicle is powered off or not enabled. A primary propulsion on state is a state that is not a primary propulsion off state.

Additionally, the BCM 24 and/or the ECM 26 may provide vehicle state information corresponding to the vehicle state or of certain vehicle components or systems, including the VSMs discussed herein. For example, the BCM 24 and/or the ECM 26 may provide the onboard computer 30 and/or the telematics unit 36 with information indicating whether the vehicle is in a primary propulsion on state or a primary propulsion off state, battery information from a vehicle battery system, image data (or other onboard sensor data) from driver-facing camera 42, steering wheel touch data from steering wheel touch sensor 44, steering wheel torque data from steering wheel torque sensor 46, safety-related sensor data from safety-related sensor(s) 48, etc. The information can be sent to the onboard computer 30 and/or the telematics unit 36 (or other vehicle computer/controller) automatically upon receiving a request from the device/computer, automatically upon certain conditions being met, upon a request from another VSM, or periodically (e.g., at set time intervals). The BCM 24 and/or the ECM 26 can also be used to detect the presence of a predetermined vehicle operating condition, which can be carried out by (for example) comparing the predetermined vehicle operating condition (or information pertaining thereto) to current vehicle operating conditions (or present vehicle information). The BCM 24 and/or the ECM 26 can then wake-up or otherwise inform the onboard computer 30 and/or the telematics unit 36 of this event. In other embodiments, the onboard computer 30 and/or the telematics unit 36 can carry out this detecting function based on information received from the BCM 24 and/or the ECM 26.

The onboard computer 30 includes a processor 32 and memory 34. The processor 32 can be used for executing various computer instructions, including those that may be stored on memory 34. The onboard computer 30 is shown as being separate from other VSMs; however, in at least some embodiments, the onboard computer 30 can be a part of or integrated with another VSM of the vehicle electronics 20, such as the sensors 42-48, an external object calculation module (EOCM), the BCM 24, an infotainment unit, a center stack module (CSM), the telematics unit 36, an AV controller, etc. In at least one embodiment, the onboard computer 30 carries out one or more steps of the method discussed below.

The processor 32 is included as a part of the onboard computer 30 and can be any type of device capable of processing electronic instructions including microprocessors, microcontrollers, host processors, controllers, vehicle communication processors, and application specific integrated circuits (ASICs). It can be a dedicated processor used only for onboard computer 30 or can be shared with other vehicle systems. The processor 32 executes various types of digitally-stored instructions, such as software or firmware programs stored in memory 34, which enable the onboard computer 30 to provide a wide variety of services. For instance, the processor 32 can execute programs or process data to carry out at least a part of the method 200 (FIG. 2) discussed below. The memory 34 may be a temporary powered memory, any non-transitory computer-readable medium, or other type of memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and magnetic or optical disc drives. Similar components to the processor 32 and/or memory 34 can be included in the GNSS receiver 22, the BCM 24, the ECM 26, the telematics unit 36, the onboard vehicle sensors 42-48, an infotainment unit, and/or various other VSMs that typically include such processing/storing capabilities. Also, in some embodiments, the onboard computer 30 can be integrated with other VSM(s) and, in such embodiments, can share one or more processors and/or memory with the other VSM(s).

In one embodiment, the onboard computer 30 is an external object calculation module (EOCM) that carries out various autonomous vehicle (AV) functionality, such as AV trajectory planning and/or AV maneuvering. An autonomous vehicle (AV) is a vehicle that is at least party semi-autonomous. In one embodiment, the vehicle is a low-level autonomous vehicle, which is an AV that is a Level 1 through 3 according to the National Highway Traffic Safety Administration (NHTSA).

The telematics unit 36 is capable of communicating data via cellular network communications through use of a cellular chipset. In at least one embodiment, the telematics unit 36 includes a cellular chipset, a processor, memory, and one or more antennas 38. In one embodiment, the telematics unit 36 may be a standalone module or, in other embodiments, the telematics unit 36 may be incorporated or included as a part of one or more other vehicle system modules, such as a center stack module (CSM), the onboard computer 30, the GNSS receiver 22, BCM 24, the ECM 26, a head unit, an infotainment unit, and/or a gateway module. For example, the GNSS receiver 22 can be integrated into the telematics unit 36 so that, for example, the GNSS receiver 22 and the telematics unit 36 are directly connected to one another as opposed to being connected via the communications bus 40. The telematics unit 36 can be implemented as an OEM-installed (embedded) or aftermarket device that is installed in the vehicle. In some embodiments, the telematics unit 36 can also include short-range wireless communications (SRWC) functionality, and can include a SRWC circuit. In such an embodiment, the telematics unit 36 can establish a SRWC connection with the HWD 90 so that messages can be communicated between the vehicle 12 and the HWD 90. The communications between the vehicle 12 and the HWD 90 can be facilitated by the vehicle user application 92 or other application, for example.

As mentioned above, the telematics unit 36 includes a cellular chipset thereby allowing the device to communicate via one or more cellular protocols, such as those used by wireless carrier system 70. In such a case, the telematics unit is user equipment (UE) that can attach to wireless carrier system 70 and carry out cellular communications, which can enable the vehicle electronics to connect to the backend facility 80 and/or the remote server 78. The telematics unit 36 can include a subscriber identity module (SIM) that can be used for enabling cellular communications with the cellular carrier system 70.

The telematics unit 36 may enable vehicle 12 to be in communication with one or more remote networks (e.g., one or more networks at backend facility 80 or the remote server 78) via packet-switched data communication. This packet-switched data communication may be carried out through use of a non-vehicle wireless access point that is connected to a land network via a router or modem, for example. When used for packet-switched data communication such as TCP/IP, the telematics unit 36 can be configured with a static IP address or can be set up to automatically receive an assigned IP address from another device on the network such as a router or from a network address server.

Packet-switched data communications may also be carried out via use of a cellular network that may be accessible by the telematics unit 36. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known in the art.

The vehicle 12 includes various onboard vehicle sensors 42-48, including a driver-facing camera 42, a steering wheel touch sensor 44, a steering wheel torque sensor 46, and safety-related sensors 48. In many embodiments, the vehicle 12 also include other onboard vehicle sensors that are not shown in the illustrated embodiment and/or explicitly discussed herein. Generally, the onboard vehicle sensors can obtain information (or onboard sensor data) pertaining to the operating state of the vehicle (the "vehicle operating state") and/or the environment of the vehicle (the "vehicle environmental state"). The sensor information can be sent to other VSMs, such as the BCM 24, the onboard computer 30, and/or the telematics unit 36. Also, in some embodiments, the onboard sensor data can be sent with metadata, which can include data identifying the sensor (or type of sensor) that captured the onboard sensor data, a timestamp (or other time indicator), a vehicle location (at which the vehicle was located when the onboard sensor data was captured), and/or other data that pertains to the onboard sensor data, but that does not make up the onboard sensor data itself. The "vehicle operating state" or "vehicle operating conditions" refers to a state of the vehicle concerning the operation of the vehicle, which can include the operation of the primary mover (e.g., a vehicle engine, vehicle propulsion motors) and/or the operation of various VSMs or components of the vehicle. Additionally, the vehicle operating state (or conditions) can include the vehicle state pertaining to mechanical operations of the vehicle or electrical states of the vehicle (e.g., a state informed by sensor information indicating a vehicle door is opened). The "vehicle environmental state" refers to a vehicle state concerning the area surrounding the vehicle and interior cabin areas of the vehicle The vehicle environmental state can include traffic conditions (e.g., an amount of traffic for a given roadway), roadway conditions (e.g., ice or snow on the roadways), roadway features (e.g., roadway geometry, traffic signals, lane information), vehicle location, driver attention/inattention conditions, and other vehicle information (e.g., information collected from other nearby vehicles, such as via V2V communications). The vehicle 12 can include one or more environmental sensors, which are onboard vehicle sensors that capture information of the vehicle environmental state.

The driver-facing camera 42 is a vehicle camera and is used to obtain onboard sensor data. The vehicle can include one or more other vehicle cameras. The vehicle cameras are environmental sensor(s) that are mounted on vehicle 12 and that is/are any suitable digital camera known or used in the industry. The vehicle camera(s) may provide vehicle video data to one or more components of the vehicle electronics 20, including to the BCM 24, the onboard computer 30, and/or the telematics unit 36. Depending on the particular application, the vehicle camera(s) may be: an infrared camera, a still camera, a video camera, and/or some other type of image generating device; a BW and/or a color camera; a front-, rear-, side- and/or 360°-facing camera; part of a mono and/or stereo system; an analog and/or digital camera; a short-, mid- and/or long-range camera; and a wide and/or narrow FOV (aperture angle) camera, to cite a few possibilities. In one example, each vehicle camera outputs raw vehicle video data, whereas in other examples each vehicle camera includes image processing resources and performs pre-processing on the captured images before outputting them as vehicle video data.

In the illustrated embodiment, the vehicle includes the driver-facing camera 42, which is a camera that is mounted on the vehicle so that a field of view of the camera faces an area in which a driver's face is located while operating the vehicle. This driver-facing camera 42 is an example of a driver attention sensor that captures onboard sensor data used to determine a driver inattention metric and/or detect a driver inattention event. In one particular embodiment, the driver-facing camera 42 is mounted in front of the driver, such as on the dashboard, or on (or near) an instrument panel of the vehicle. The driver-facing camera 42, according to some embodiments, can be used to track eye movement (or direction) of the driver's eyes using various object recognition and/or other image processing techniques. In one embodiment, this driver-facing camera 42 can be an infrared camera. This driver-facing camera 42 that obtains image data for purposes of tracking one or more eyes of the vehicle driver can be used to determine whether the vehicle driver's eyes are focused on the road in front of the vehicle. Additionally or alternatively, image data from this driver-facing camera 42 can be processed to determine an angle of rotation of the driver's head. The vehicle electronics, such as through use of the onboard computer 30, can use this eye-tracking feature and/or head-tracking feature to determine the presence of a driver inattention event. For example, when a driver is determined to direct their eyes to the left side of the vehicle, the vehicle can record this initial event as a driver inattention start event and can then track the amount of time until the driver directs their eyes to the front of the vehicle. When the driver directs their eyes back to the road (in front of the vehicle), then this event can be recorded as a driver inattention end event. This driver inattention event can thus be demarcated by the driver inattention start event and the driver inattention end event. A driver inattention event length can then be determined as the time between the driver inattention end event and the driver inattention start event. Also, in some embodiments, a predetermined amount of time must first pass (between driver inattention start event and the driver inattention end event) before being considered a driver inattention event. This feature can be used, in some embodiments, to allow the driver to quickly or briefly avert their attention away from the road so as to look at other vehicles in other lanes.

In some embodiments, the vehicle electronics 20 includes a plurality of driver-facing cameras, which can be located at different positions within the vehicle to provide diverse perspectives of the driver. Although this eye-tracking or head-tracking feature is described as being implemented by the driver-facing camera 42, other types of onboard vehicle sensors or other sensors can be used as well to track the eye(s) and/or head of the driver. The sensors that implement the eye-tracking feature are referred to herein as eye-tracking sensors and the sensors that implement the head-tracking feature are referred to herein as head-tracking sensors. In one embodiment, the HWD 90 is a pair of smart-glasses or goggles that can track the eye movement of the driver. This sensor data and/or eye-tracking data can be provided to the vehicle electronics via a SRWC connection, for example.

As mentioned above, the vehicle can include other cameras other than the driver-facing camera 42. For example, the vehicle 12 includes a collection of complementary metal-oxide semiconductor (CMOS) cameras or image sensors located around the vehicle, including a number of forward-facing CMOS cameras that provide digital images that can be subsequently stitched together to yield a 2D or 3D representation of the road and environment in front and/or to the side of the vehicle.

The steering wheel touch sensor 44 is an onboard vehicle sensor that detects whether a driver has their hands on the steering wheel of the vehicle. The steering wheel touch sensor 44 is an example of a driver attention sensor. The touch sensor can be a capacitive touch sensor or any other suitable sensor that is capable of determining whether the vehicle driver's hands are engaged to the steering wheel. The steering wheel touch sensor 44 is a driver attention sensor since the sensor data obtained by the steering wheel touch sensor 44 can be used to determine whether the driver is paying attention and/or otherwise engaged in the driving of the vehicle.

The steering wheel torque sensor 46 is an onboard vehicle sensor that detects whether a torque is being applied to the steering wheel. The steering wheel torque sensor 46 is another example of a driver attention sensor. The steering wheel torque sensor 46 can be implemented in a variety of ways, and can include one or more electromechanical sensors that are coupled to a portion of the steering column or steering wheel. As mentioned above, the vehicle 12 can be an autonomous vehicle and, in some embodiments, vehicle steering may be (at least partly) controlled by the vehicle 12. Thus, when the vehicle automatically controls the steering and the steering wheel, the steering wheel torque sensor 46 can determine a portion of the torque that is being applied to the steering wheel by the driver and not by the vehicle as a part of the autonomous steering.

The safety-related sensors 48 include one or more onboard vehicle sensors that are used to detect one or more safety conditions relating to the occupants of the vehicle. For example, an example of a safety-related sensor is a seatbelt sensor that determines whether one or more seatbelts (e.g., the driver seatbelt, one or more other passenger seatbelts) are secured. Additionally, the vehicle 12 can include other sensors not mentioned above, including parking sensors, lane change and/or blind spot sensors, lane assist sensors, ranging sensors (i.e., sensors used to detect the range between the vehicle and another object, such as through use of radar or lidar), security- or theft-related sensors, tire-pressure sensors, fluid level sensors (e.g., a fuel or gas level sensor, a windshield wiper fluid level sensor), brake pad wear sensors, rain or precipitation sensors (e.g., infrared light sensor(s) directed toward the windshield (or other window of the vehicle 12) to detect rain or other precipitation based on the amount of reflected light), and interior or exterior temperature sensors.

The vehicle electronics 20 also includes a number of vehicle-user interfaces that provide vehicle occupants with a means of providing and/or receiving information, including the visual display 50, pushbutton(s) 52, microphone(s) 54, and the audio system 56. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the telematics unit 36 to provide other data, response, or control input. However, one or more of the pushbutton(s) 52 can be connected to one or more other VSMs and/or the communications bus 40. The audio system 56 provides audio output to a vehicle occupant and can be a dedicated, stand-alone system or part of the primary vehicle audio system. According to the particular embodiment shown here, the audio system 56 is operatively coupled to both communications bus 40 and an entertainment bus (not shown) and can provide various in-vehicle entertainment functionality, including AM, FM and satellite radio, CD, DVD, audio and/or video streaming or playback from the HWD 90 (or other device (e.g., remote server 78)), and other multimedia functionality. This in-vehicle entertainment functionality can be provided in conjunction with or independent of an infotainment module. The microphone(s) 54 provide audio input to the vehicle electronics 20 to enable the driver or other occupant to provide voice commands and/or carry out hands-free calling via the wireless carrier system 70. For this purpose, it can be connected to an on-board automated voice processing unit utilizing human-machine interface (HMI) technology known in the art.

Visual display or touch screen 50 can be a graphics display and can be used to provide a multitude of input and output functions. Display 50 can be a touch screen on the instrument panel, a heads-up display reflected off of the windshield, or a projector that can project graphics for viewing by a vehicle occupant. In one embodiment, the display 50 can be coupled to an infotainment unit and used to configure and/or carry out various in-vehicle entertainment functionality. Moreover, in some embodiments, one or more parameters or settings of the method (or "driver inattention settings") below can be adjusted through using a touchscreen display (or other vehicle-user interfaces). The driver inattention settings can be accessed by an authorized user in response to receiving credentials, such as a key-code or pin, or a password. The vehicle-user interfaces can be used to provide notifications and/or warnings to the vehicle users, and/or to obtain input or other data from the vehicle users. Various other human-machine interfaces for providing input from a human to the vehicle as the interfaces of FIG. 1 are only an example of one particular implementation.

Figure 2:
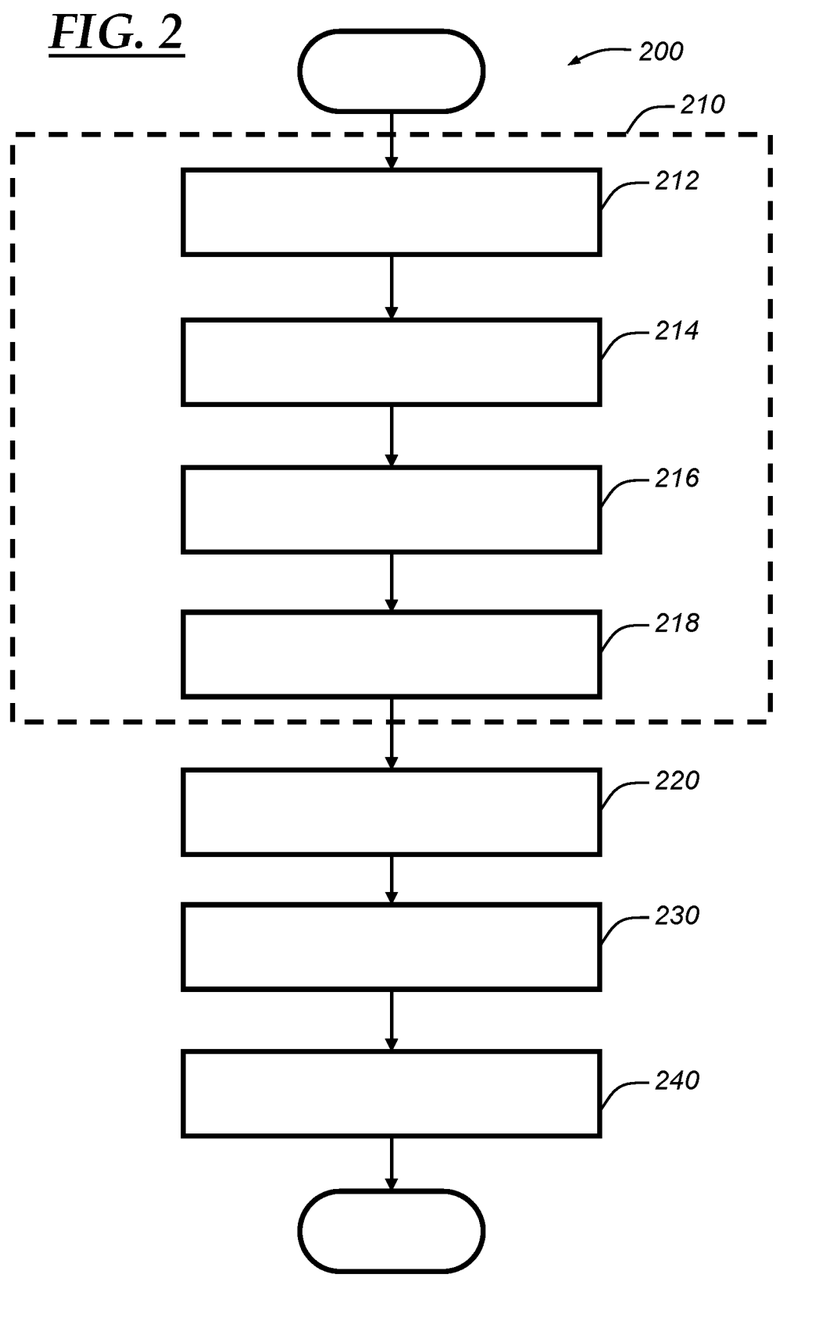
FIG. 2 is a flowchart of an embodiment of a method of carrying out a remedial action based on monitoring driver attention of a vehicle driver.

With reference to FIG. 2, there is shown a method 200 of carrying out a remedial action based on monitoring driver attention of a vehicle driver. In one embodiment, the method 200 (or any steps thereof) is carried out by the vehicle electronics 20. In some embodiments, the method 200 is carried out by at least some of the onboard vehicle sensors 42-48 and the onboard computer 30. In one embodiment, the onboard computer is an external object control module (EOCM), an AV control module, a body control module, an infotainment module, or a combination thereof. Although the steps of the method 200 are described as being carried out in a particular order, it is hereby contemplated that the steps of the method 200 can be carried out in any suitable order as will be appreciated by those skilled in the art.

The method 200 begins with step 210, wherein a driver attention monitoring process is carried out. The driver attention monitoring process 210 includes obtaining driver attention sensor data from one or more driver attention sensors and then determining a driver inattention metric based on this driver attention sensor data, which is onboard sensor data obtained by the one or more driver attention sensors. The driver attention monitoring process 210 can include other steps, such identifying a driver inattention level.

The driver attention monitoring process 210 begins with step 212, wherein driver attention sensor data (a type of onboard sensor data) is obtained from one or more driver attention sensors. Examples of driver attention sensors include the driver-facing camera 42, the steering wheel touch sensor 44, and the steering wheel torque sensor 46. In one embodiment, the driver attention sensor data is received at the onboard computer 30 from the one or more driver attention sensors via the communications bus 40. The one or more driver attention sensors can first sample and/or otherwise process sensor information captured, and/or may provide raw sensor data as the driver attention sensor data to the onboard computer 30. The process 210 continues to step 214.

In step 214, it is determined whether a driver inattention event has occurred based on the driver attention sensor data. The driver inattention event is an event that indicates that the driver is not paying attention to or engaged with driving the vehicle. As mentioned above, the driver inattention event can be demarcated by a driver inattention start event and a driver inattention end event. The driver inattention start event can be identified based on processing driver attention sensor data and, based on this processing, determining that the driver is not paying attention to or engaged with driving the vehicle. For example, when it is detected that the driver is not looking at the road based on image data from the driver-facing camera 42, then a driver inattention start event is identified. As another example, when it is detected that the driver does not have their hands engaged on the steering wheel based on the onboard sensor data from the steering wheel touch sensor 44, then a driver inattention start event is identified. As yet another example, when it is detected that the driver is not providing more than a threshold amount of torque on the steering wheel based on the onboard sensor data from the steering wheel torque sensor 46, then a driver inattention start event is identified. Also, in some embodiments, a combination of these techniques can be used. Additionally or alternatively, various other driver attention sensors and techniques can be used to identify a driver inattention start event. In at least some embodiments, a driver inattention event is detected and/or identified in response to identifying a driver inattention start event.

The driver inattention end event can be identified based on processing driver attention sensor data and, based on this processing, determining that the driver is paying attention to or engaged with driving the vehicle after having identified a driver inattention start event (with no other corresponding driver inattention end event). For example, when it is detected that the driver is looking at the road based on image data from the driver-facing camera 42, then a driver inattention end event is identified. As another example, when it is detected that the driver does have their hands engaged on the steering wheel based on the onboard sensor data from the steering wheel touch sensor 44, then a driver inattention end event is identified. As yet another example, when it is detected that the driver is providing more than a threshold amount of torque on the steering wheel based on the onboard sensor data from the steering wheel torque sensor 46, then a driver inattention end event is identified. Various other driver attention sensors and techniques can be used to identify a driver inattention start event and/or a driver inattention end event. Once a driver inattention event is identified, the process 210 continues to step 216.

In step 216, a driver inattention metric is determined based on the driver attention sensor data and in response to the detected driver inattention event. As mentioned above, examples of driver inattention metrics include a driver inattention event count and a driver inattention event length, which can include a driver inattention event overall length and/or a driver inattention event average length. In some embodiments, this step includes incrementing the driver inattention event count by one (or per each driver inattention event). In one embodiment, the driver inattention event count is incremented in response to identifying a driver inattention start event. Or, in other embodiments, the driver inattention event count is incremented in response to identifying a driver inattention end event.

In addition to or in lieu of incrementing or otherwise determining the driver inattention event count, a driver inattention event length can be determined. The driver inattention event length can include a length of a single driver inattention event (referred to as a "single driver inattention event length"), a length of a plurality of driver inattention events, a driver inattention event overall length, a driver inattention event average length, and/or other values of time pertaining to the difference in time between the driver inattention start event and the driver inattention end event. In one embodiment, the driver inattention event length is determined in response to identifying a driver inattention start event. Or, in other embodiments, the driver inattention event length is determined in response to identifying a driver inattention end event. The process 210 then proceeds to step 218.

Figure 3:
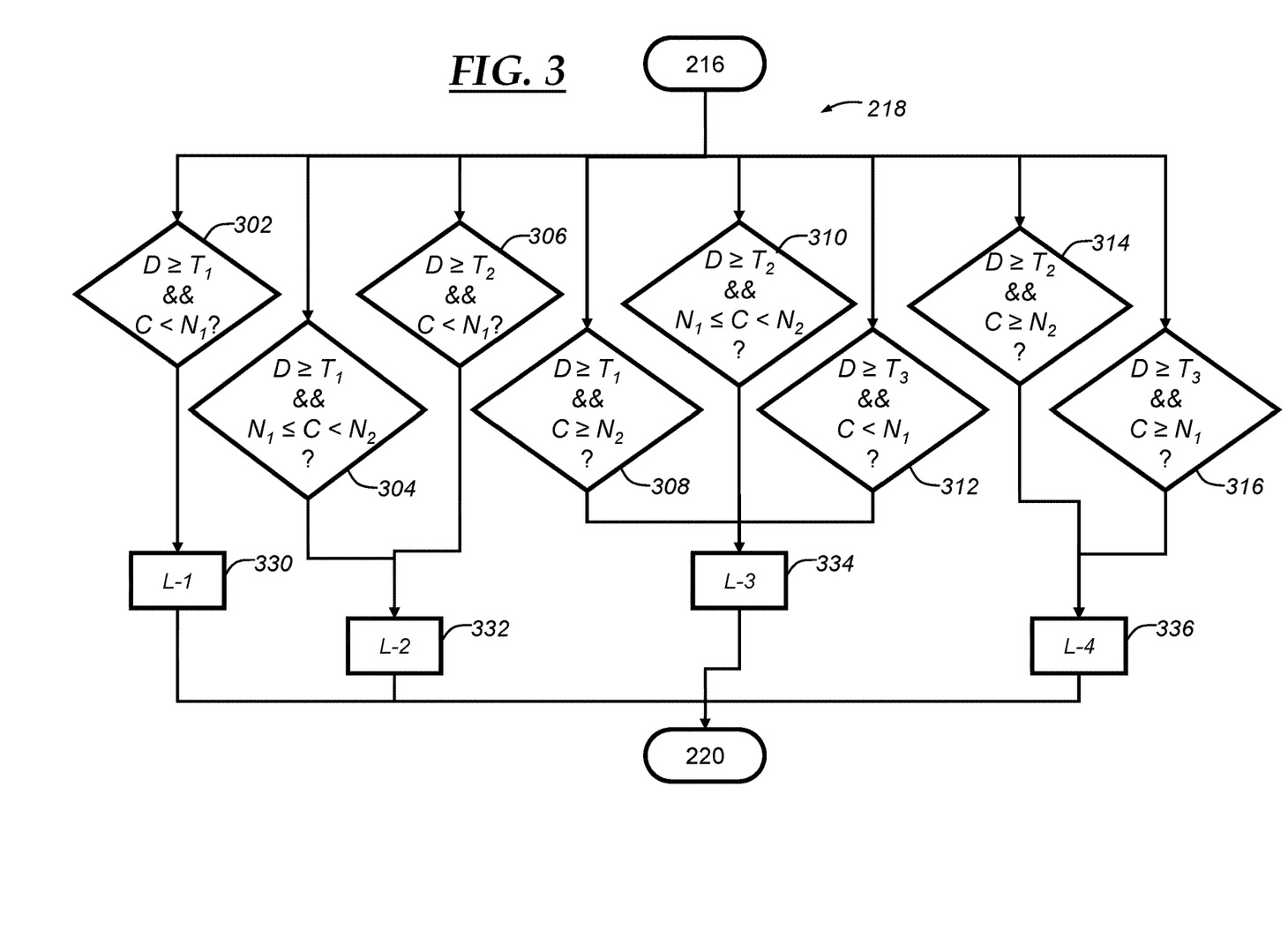
FIG. 3 is a flowchart of an embodiment of determining a driver inattention level that can be used as a part of the method of FIG. 2.

In step 218, a driver inattention level is determined based on one or more driver inattention metrics. This step is optional as, in some embodiments, the remedial action(s) can be determined (step 220) directly from the driver attention sensor data and/or the driver inattention metrics. In one embodiment, one or more driver inattention levels can be defined with respect to a degree or level of driver inattention. With reference to FIG. 3, there is shown an exemplary embodiment of carrying out step 218. This embodiment can be used to map a driver inattention event length D and a driver inattention event count C to one of four levels L-1 to L-4, which are associated with reference numerals 330-336. The driver inattention event length D is compared to one or more driver inattention event length thresholds denoted $T_i$ (where $T_i$ indicates the i-th threshold). The driver inattention event count C is compared to one or more driver inattention event count thresholds denoted $N_j$ (where $N_j$ indicates the j-th threshold). The embodiment of FIG. 3 depicts numerous decision-blocks 302-316, but only illustrates one output per each decision-block. In each of these decision-blocks 302-316, if the condition within the decision-block is satisfied, then the associated driver inattention level is determined to be the driver inattention level connected as the output of that decision-block. In scenarios in which the driver inattention event metrics satisfy more than one of the decision-blocks 302-316, the highest driver inattention level is determined to be the driver inattention level.

The exemplary embodiment of step 218 depicted in FIG. 3 uses a first driver inattention event length threshold $T_1$, a second driver inattention event length threshold $T_2$, and a third driver inattention event length threshold $T_3$. As an example, the first length threshold $T_1$ can be five (5) seconds, the second length threshold can be ten (10) seconds, and the third length threshold can be fifteen (15) seconds. The exemplary embodiment of step 218 depicted in FIG. 3 also uses a first driver inattention event count threshold $N_1$ and a second driver inattention event count threshold $N_2$. As an example, the first count threshold $N_1$ can be five (5) and the second count threshold $N_2$ can be ten (10).

According to the embodiment of step 218 presented in FIG. 3, with respect to decision-block 302, when the driver inattention event length D is greater than or equal to the first driver inattention event length threshold $T_1$ and the driver inattention event count C is less than the first driver inattention event count threshold $N_1$, the driver inattention level is determined to be the first level L-1 as indicated at 330. With respect to decision-block 304, when the driver inattention event length D is greater than or equal to the first driver inattention event length threshold $T_1$ and the driver inattention event count C is greater than or equal to the first driver inattention event count threshold $N_1$ and less than the second driver inattention event count threshold $N_2$, the driver inattention level is determined to be the second level L-2 as indicated at 332. With respect to decision-block 306, when the driver inattention event length D is greater than or equal to the second driver inattention event length threshold $T_2$ and the driver inattention event count C is less than the first driver inattention event count threshold $N_1$, the driver inattention level is determined to be the second level L-2 as indicated at 332. With respect to decision-block 308, when the driver inattention event length D is greater than or equal to the first driver inattention event length threshold $T_1$ and the driver inattention event count C is greater than or equal to the second driver inattention event count threshold $N_2$, the driver inattention level is determined to be the third level L-3 as indicated at 334. With respect to decision-block 310, when the driver inattention event length D is greater than or equal to the second driver inattention event length threshold $T_2$ and the driver inattention event count C is greater than or equal to the first driver inattention event count threshold $N_1$ and less than the second driver inattention event count threshold $N_2$, the driver inattention level is determined to be the third level L-3 as indicated at 334. With respect to decision-block 312, when the driver inattention event length D is greater than or equal to the third driver inattention event length threshold $T_3$ and the driver inattention event count C is less than the first driver inattention event count threshold $N_1$, the driver inattention level is determined to be the third level L-3 as indicated at 334. With respect to decision-block 314, when the driver inattention event length D is greater than or equal to the second driver inattention event length threshold $T_2$ and the driver inattention event count C is greater than or equal to the second driver inattention event count threshold $N_2$, the driver inattention level is determined to be the fourth level L-4 as indicated at 336. With respect to decision-block 316, when the driver inattention event length D is greater than or equal to the third driver inattention event length threshold $T_3$ and the driver inattention event count C is greater than or equal to the first driver inattention event count threshold $N_1$, the driver inattention level is determined to be the fourth level L-4 as indicated at 336.

According to at least some embodiments, the process 210 is carried out continuously so as to update the driver inattention level in a continuous manner while the vehicle is operated. And, in some embodiments, steps 216-218 can be carried out in response to identifying a driver inattention end event and, in at least some of such embodiments, the driver inattention event length D used in step 218 is a single driver inattention event length of the current (or most recently-identified) driver inattention event. In other embodiments, the driver inattention event length D is a running driver inattention event average length that is continuously updated as new driver inattention events are identified and/or their associated driver inattention event metrics are determined. And, in another embodiment, the driver inattention event length D is a driver inattention event overall length that is continuously updated. Once the driver inattention level is determined, the method 200 continues to step 220.

In step 220, one or more remedial actions are determined based on the determined driver inattention level. As mentioned above, although the present embodiment 200 uses a determined driver inattention level as a basis for determining the one or more remedial actions to be carried out, in other embodiments, the remedial action(s) can be determined directly from the driver attention sensor data and/or the driver inattention metrics. Also, since the driver inattention level is based on the driver inattention metrics, which is in turn based on the driver attention sensor data, determining the remedial action(s) based on the driver inattention level is considered as determining the remedial action(s) based on the driver inattention metrics and the driver inattention sensor data.

In at least one embodiment, the driver inattention levels are each associated with a particular set of remedial actions where the first level L-1 (indicated at 330) is associated with a first remedial action set, the second level L-2 (indicated at 332) is associated with a second remedial action set, the third level L-3 (indicated at 334) is associated with a third remedial action set, and the fourth level L-4 (indicated at 336) is associated with a fourth remedial action set. Each of these sets of remedial actions can include one or more remedial actions. In one embodiment, each remedial action set includes different remedial actions such that none of the remedial actions in one set are the same as those in another set. In other embodiments, each remedial action set is different than another one of the remedial action sets with respect to at least one remedial action, although other remedial actions of the two remedial action sets may be the same. In an exemplary embodiment: the first remedial action set includes turning down the volume of the audio system 56 (or at least the volume for one or more entertainment-related applications) and limiting use of one or more infotainment and/or entertainment-related applications provided by the vehicle; the second remedial action set includes turning off the audio system 56 (or at least the volume for one or more entertainment-related applications) and turning off one or more infotainment and/or entertainment-related applications provided by the vehicle; the third remedial action set includes activating voice commands, chimes, and haptic output or feedback devices; and the fourth remedial action set includes turning off the audio system 56 (or at least the volume for one or more entertainment-related applications) turning off one or more infotainment and/or entertainment-related applications provided by the vehicle until the next key cycle (e.g., until the vehicle ignition is turned off and then turned on again).

In some embodiments, any one or more of the remedial actions of the first, second, and third remedial action sets can be carried out so that their effects (e.g., restricting volume) last for a predetermined amount of time. In some embodiments, this predetermined amount of time may vary based on the driver inattention level with, for example, higher levels corresponding to longer periods of time in which the remedial action(s) are carried out or effected. In some embodiments, the vehicle electronics can disallow or prevent any manual input received locally at the vehicle from a vehicle-user interface to override the result of these remedial actions, at least for a predetermined amount of time. For example, with respect to the first remedial action set, the radio can be turned down and the vehicle electronics can prevent or inhibit typical vehicle actions that result in turning the volume back up above a predetermined limit, or may lock the volume to a predetermined value. Also, in embodiments where the remedial action (and/or its effects) are carried out or applied until the next key cycle, a predetermined time limit can be used as well so that the vehicle driver does not simply stop, turn off the vehicle, and then turn the vehicle back on so as to negate the effects of the remedial action(s). In some embodiments, the vehicle can store information pertaining to any one or more of the steps 210-220 so as to retain the driver inattention level, the driver inattention metrics, and/or other data or information.

As mentioned above, in some embodiments, the vehicle can directly determine one or more remedial actions based on the driver attention sensor data and/or the driver inattention metrics. For example, the vehicle can include predefined information or functions that are configured to map certain driver attention sensor data (including one or more attributes, properties, or portions thereof) to one or more remedial actions. The method 200 then continues to step 230.

In step 230, the determined remedial action(s) are carried out by the vehicle. In one embodiment, the onboard computer 30 or other VSM that determined the remedial action(s) sends a command (or request) to another VSM that carries out the remedial action(s). In some embodiments, the particular VSM that carries out the remedial action may depend on the particular remedial action(s). For example, where the remedial action is to turn down the volume of the audio system 56, the onboard computer 30 can send a command to the BCM 24, which can then control the audio system 56, or the onboard computer 30 can directly send a command (or request) to the audio system 56. As another example, the onboard computer 30 can send a command (or request) to an infotainment unit or the telematics unit 36 so as to cause the remedial action to be carried out.

The method 200 then continues back to step 210. It should be appreciated that, in at least some embodiments, any one or more of the steps 210-230 can be carried out continuously and since the driver attention monitoring process can be carried out continuously so as to constantly monitor driver attention, at least in some embodiments. The method 200 continues to step 240 in response to detecting or anticipating a transition from a primary propulsion on state to a primary propulsion off state. In some embodiments, a driver attention report can continuously be updated in response to the steps 214-218, or may be generated at the end such as in response to detecting or anticipating a transition from a primary propulsion on state to a primary propulsion off state.

In step 240, a driver attention report is provided to one or more vehicle users. This step can include providing the driver attention report to one or more local vehicle users (e.g., the driver, vehicle passengers) and/or to one or more remote vehicle users, such as a parent or authority figure of the driver, whom may be a teenager in an exemplary scenario. In one embodiment, the driver attention report is generated at the vehicle, such as by the onboard computer or an infotainment unit. In other embodiments, the driver attention report is generated at a remote server or backend facility, such as the remote server 78 or backend facility 80. In such embodiments, the vehicle can provide any information needed to generate the driver attention report, which can include driver inattention metrics, a driver inattention level (or a plurality of driver inattention levels each with an associated timestamp illustrating when the associated level was reached), and/or other data, such as the driver attention sensor data and/or other onboard sensor data.

The driver attention report can be provided to one or more local vehicle users via a vehicle-user interface, such as via the display 50 and/or the audio system 56. For example, in one embodiment, the driver attention report is presented on the display 50 as a part of a vehicle trip report summary that provides certain information pertaining to the vehicle trip. The vehicle trip report summary can include certain metrics pertaining to the vehicle trip, such as a distance driven, a maximum vehicle speed, a number or count of speed warnings, a count of instances in which the throttle was wide open, a count of forward collision alerts, traction and/or stability control metrics, etc. The driver attention report (and/or the vehicle trip report summary) can be sent to the HWD 90 via an SRWC connection between the vehicle electronics 20 and the HWD 90, and then presented at the HWD 90, such as through using an electronic display of the HWD 90.

The driver attention report can be provided to one or more remote vehicle users. In embodiments where the driver attention report is generated at the vehicle (or made available to the vehicle), the vehicle can send the driver attention report to one or more remote devices, such as a remotely-located HWD or a remote computer, via the telematics unit 36, for example. In embodiments where the driver attention report is generated at a remote server or backend facility (or made available to remote server or backend facility), the remote server or backend facility can send the driver attention report to one or more remote devices, such as a remote HWD or a remote computer, via the land network 76 and/or the wireless carrier system 70, for example. The driver attention report, the driver inattention metrics, the driver inattention level, onboard sensor data, and/or other information used as a part of the method 200 can be sent from the vehicle to a backend facility and stored in a database, such as in one or more databases 84. The method 200 then ends.

In some embodiments, the method 200 can further include obtaining onboard sensor data other than the driver attention sensor data. In one embodiment, this other onboard sensor data can be safety-related sensor data from the safety-related sensor(s) 48, which can include seatbelt restraint sensor data. For example, step 218 can include determining whether a seatbelt restraint of the driver (and/or one or more other detected passengers) is secured and, when it is not, then the driver inattention level can be increased by one level. Other types of safety-related data other than the driver attention sensor data can be used to determine the remedial action(s), such as data indicating driving over the speed limit, erratic driving (e.g., swerving), etc.

In some embodiments, the method 200 can be carried out only for particular vehicle users. For example, the method 200 can identify the driver using a variety of techniques, such as identifying a vehicle key that is used to start and/or activate the vehicle, through detection of one or more HWDs, or through input from one or more vehicle users. For example, the vehicle can be configured to carry out the method 200 when the vehicle is started with a first vehicle key and not when the vehicle is started with a second vehicle key. Also, in one embodiment, the method 200 or its effects can be disabled through an override providing by a vehicle user, such as through using one or more vehicle user interfaces. For example, a vehicle user can enter a key code that can be verified and, when verified, the method 200 is not carried out or the remedial action(s) are not carried out. Also, in some instances when the override is provided, the in-vehicle functionality can be restored (e.g., the volume is no longer restricted).

In one embodiment, the method 200 and/or step(s) or parts thereof can be implemented in one or more computer programs (or "applications", or "scripts") embodied in one or more computer readable mediums and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

The computer program(s) can be embodied on computer readable media (e.g., memory of the vehicle 12 (e.g., memory 34), other vehicle memory, memory of the remote server 78, memory of the backend facility 80, a combination thereof), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

What is claimed is:

1. A method of carrying out a remedial action based on monitoring driver attention of a vehicle driver, wherein the method comprises the steps of:

obtaining driver attention sensor data from one or more driver attention sensors that are installed on the vehicle as onboard vehicle sensors, comprising an eye-tracking sensor used to track eye movement to determine whether the vehicle driver's eyes are focused on a road in front of the vehicle;

detecting driver inattention events based on the obtained driver attention sensor data, comprising driver inattention events demarcated by driver inattention start events and driver inattention end events, wherein the driver inattention start events comprise determining the driver's eyes are directed away from the road in front of the vehicle based upon the tracked eye movement and the driver inattention end events comprise determining the driver's eyes are directed back to the road in front of the vehicle based upon the tracked eye movement;

determining driver inattention metrics based on the obtained driver attention sensor data and in response to the detected driver inattention events, the driver inattention metrics comprising an average length (D) of the driver inattention events and a count (C) of the driver inattention events;

mapping the driver inattention metrics to a plurality of hierarchical inattention levels (L-1, L-2, L-3 and L-4) to determine at least one driver inattention level, the mapping comprising:
  comparing the average length (D) to a plurality of length thresholds ($T_1$, $T_2$ and $T_3$) wherein $T_1<T_2<T_3$;
  comparing the count (C) to a plurality of count thresholds ($N_1$ and $N_2$) wherein $N_1<N_2$; and
  using a plurality of decisions based upon mutually exclusive combinations of the average length (D) comparisons and the count (C) comparisons to map each of the combinations to one of the hierarchical inattention levels, wherein the combinations comprise $D \geq T_1$ and $C<N_1$ mapping to L-1, $D \geq T_1$ and $N_1 \leq C<N_2$ mapping to L-2, $D \geq T_2$ and $C<N_1$ mapping to L-2, $D \geq T_1$ and $C \geq N_2$ mapping to L-3, $D \geq T_2$ and $N_1 \leq C<N_2$ mapping to L-3, $D \geq T_3$ and $C<N_1$ mapping to L-3, $D \geq T_2$ and $C \geq N_2$ mapping to L-4, and $D \geq T_3$ and $C \geq N_1$ mapping to L-4;
based on the determined at least one driver inattention level, determining one or more remedial actions to be carried out; and
carrying out the one or more remedial actions, wherein, when at least one of the one or more remedial actions is carried out, in-vehicle entertainment that is provided by one or more vehicle-user interfaces of the vehicle is restricted or prevented for a predetermined amount of time which varies based upon the determined at least one driver inattention level.

2. The method of claim 1, wherein the one or more driver attention sensors further include a driver-facing camera, a steering wheel touch sensor, and/or a steering wheel torque sensor.

3. The method of claim 1, wherein the one or more remedial actions, when carried out, results in turning down or restricting audio volume produced as a result of an in-vehicle entertainment application.

4. The method of claim 1, wherein the one or more remedial actions, when carried out, results in disabling or otherwise preventing use of an in-vehicle entertainment application.

5. The method of claim 1, wherein the one or more remedial actions, when carried out, results in restricting use of the in-vehicle entertainment application beyond a next key cycle whereby restricting use of the in-vehicle entertainment application for the predetermined amount of time is not circumvented by the next key cycle.

6. The method of claim 1, wherein the method further comprises generating a driver attention report based on the driver inattention metrics and presenting the driver attention report to one or more vehicle users.

7. The method of claim 1, further comprising obtaining onboard sensor data from an onboard vehicle sensor other than the driver attention sensors, and using the onboard sensor data in determining the one or more remedial actions to be carried out.

8. A vehicle driver attention monitoring system for a vehicle, comprising:
  one or more driver inattention sensors that are installed on the vehicle, comprising an eye-tracking sensor;
  an onboard computer having a processor;
  memory that is communicatively coupled to the processor of the onboard computer, wherein the memory stores computer instructions; and
  one or more vehicle-user interfaces for providing visual and/or audio output to a local vehicle user;
  wherein the computer instructions, when executed by the processor, cause the vehicle driver attention monitoring system to:
  obtain driver attention sensor data from the one or more driver attention sensors, comprising tracking eye movement of the vehicle driver's eyes to determine whether the vehicle driver's eyes are focused on a road in front of the vehicle;
  detect driver inattention events based on the obtained driver attention sensor data, comprising driver inattention events demarcated by driver inattention start events and driver inattention end events, wherein the driver inattention start events comprise determining the driver's eyes are directed away from the road in front of the vehicle based upon the tracked eye movement and the driver inattention end events comprise determining the driver's eyes are directed back to the road in front of the vehicle based upon the tracked eye movement;
  determine driver inattention metrics based on the driver attention sensor data and in response to the detected driver inattention events, the driver inattention metrics comprising an average length (D) of the detected driver inattention events and a count (C) of the driver inattention events;
  mapping the driver inattention metrics to a plurality of hierarchical inattention levels (L-1, L-2, L-3 and L-4) to determine at least one driver inattention level, the mapping comprising:
    comparing the average length (D) to a plurality of length thresholds ($T_1$, $T_2$ and $T_3$) wherein $T_1<T_2<T_3$;
    comparing the count (C) to a plurality of count thresholds ($N_1$ and $N_2$) wherein $N_1<N_2$; and
    using a plurality of decisions based upon mutually exclusive combinations of the average length (D) comparisons and the count (C) comparisons to map each of the combinations to one of the hierarchical inattention levels, wherein the combinations comprise $D \geq T_1$ and $C<N_1$ mapping to L-1, $D \geq T_1$ and $N_1 \leq C<N_2$ mapping to L-2, $D \geq T_2$ and $C<N_1$ mapping to L-2, $D \geq T_1$ and $C \geq N_2$ mapping to L-3, $D \geq T_2$ and $N_1 \leq C<N_2$ mapping to L-3, $D \geq T_3$ and $C<N_1$ mapping to L-3, $D \geq T_2$ and $C \geq N_2$ mapping to L-4, and $D \geq T_3$ and $C \geq N_1$ mapping to L-4;
  based on the determined at least one driver inattention level, determine one or more remedial actions to be carried out; and
  carry out the one or more remedial actions, wherein, when at least one of the one or more remedial actions is carried out, in-vehicle entertainment that is provided by the one or more vehicle-user interfaces of the vehicle is restricted or prevented for a predetermined amount of time which varies based upon the determined at least one driver inattention level.

9. The vehicle driver attention monitoring system of claim 8, wherein the onboard computer is an external object calculation module (EOCM).

* * * * *